(12) United States Patent
Guo et al.

(10) Patent No.: US 11,242,908 B2
(45) Date of Patent: Feb. 8, 2022

(54) SELF-CENTERING VISCOUS DAMPER WITH PRE-PRESSED RING SPRINGS

(71) Applicant: SOUTHEAST UNIVERSITY, Jiangsu (CN)

(72) Inventors: Tong Guo, Jiangsu (CN); Ruizhao Zhu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 331 days.

(21) Appl. No.: 16/612,403

(22) PCT Filed: Aug. 24, 2018

(86) PCT No.: PCT/CN2018/102181
§ 371 (c)(1),
(2) Date: Nov. 11, 2019

(87) PCT Pub. No.: WO2019/227713
PCT Pub. Date: Dec. 5, 2019

(65) Prior Publication Data
US 2021/0088102 A1    Mar. 25, 2021

(30) Foreign Application Priority Data

May 29, 2018   (CN) .......................... 201810537121.8

(51) Int. Cl.
*F16F 13/00*     (2006.01)
*F16F 15/02*     (2006.01)
(Continued)

(52) U.S. Cl.
CPC ............ *F16F 13/00* (2013.01); *F16F 15/022* (2013.01); *E01D 19/00* (2013.01); *E04B 1/98* (2013.01);
(Continued)

(58) Field of Classification Search
CPC ...... F16F 13/00; F16F 15/022; F16F 2228/08; F16F 2232/08; F16F 2234/02; E04H 9/0235; E04B 1/98
See application file for complete search history.

(56) References Cited

U.S. PATENT DOCUMENTS 9,169,892 B2 * 10/2015 Imbert ................... F16F 1/128
2011/0278778 A1 * 11/2011 Qattan ..................... F16F 6/00
267/151

(Continued)

FOREIGN PATENT DOCUMENTS

CN    104481047    4/2015
CN    206017548    3/2017
(Continued)

OTHER PUBLICATIONS

"International Search Report (Form PCT/ISA/210) of PCT/CN2018/102181," dated Jan. 18, 2019, with English translation thereof, pp. 1-5.

Primary Examiner — Robert A. Siconolfi
Assistant Examiner — James K Hsiao
(74) Attorney, Agent, or Firm — JCIPRNET

(57) ABSTRACT

Disclosed is a self-centering viscous damper with pre-pressed ring springs. The self-centering viscous damper with pre-pressed ring springs comprises a first inner cylinder, a second inner cylinder, a third inner cylinder, an outer cylinder, a first end cover, a second end cover, a piston, a piston rod, a ring spring, a first connector, a second connector, a first linking nut, a second linking nut, a first outer cover, a second outer cover, a first end and a second end. Due to the interaction between the inner and outer cylinders, the ring springs are further pressed whether a damper is tensioned or pressed. The ring springs have been applied with pre-pressure which overcomes a frictional force and a restoring (Continued)

force when the ring springs are in an initial equilibrium position.

9 Claims, 2 Drawing Sheets

(51) Int. Cl.
    *E04B 1/98*          (2006.01)
    *E04H 9/02*          (2006.01)
    *E01D 19/00*        (2006.01)

(52) U.S. Cl.
    CPC ........ *E04H 9/0235* (2020.05); *F16F 2228/08* (2013.01); *F16F 2232/08* (2013.01); *F16F 2234/02* (2013.01)

(56) References Cited

U.S. PATENT DOCUMENTS

| | | | | |
|---|---|---|---|---|
| 2015/0047936 A1* | 2/2015 | Slusarczyk | ........... | F16F 9/5126 |
| | | | | 188/313 |
| 2015/0330475 A1* | 11/2015 | Slusarczyk | ............... | F16F 9/49 |
| | | | | 188/288 |
| 2016/0236533 A1* | 8/2016 | Inagaki | .................. | B60G 17/08 |
| 2016/0288865 A1* | 10/2016 | Murakami | .............. | F16F 1/121 |
| 2018/0142756 A1* | 5/2018 | Knapczyk | ............... | F16F 9/463 |

FOREIGN PATENT DOCUMENTS

| | | |
|---|---|---|
| JP | H1137199 | 2/1999 |
| JP | 2002005211 | 1/2002 |

\* cited by examiner 1-1

2-2

3-3

4-4

SELF-CENTERING VISCOUS DAMPER WITH PRE-PRESSED RING SPRINGS

CROSS-REFERENCE TO RELATED APPLICATION

This is a 371 application of the International PCT application serial no. PCT/CN2018/102181, filed on Aug. 24, 2018, which claims the priority benefits of China Application No. 201810537121.8, filed on May 29, 2018. The entirety of each of the above-mentioned patent applications is hereby incorporated by reference herein and made a part of this specification.

TECHNICAL FIELD

The present invention belongs to the technical field of vibration control of building and bridge structures, and relates to a self-centering viscous damper with pre-pressed ring springs, which has good energy dissipation and self-centering ability.

BACKGROUND ART

At this stage, when the structural design is carried out according to the requirements of China's seismic code, the structure should meet the fortification goal of "Not damaged under the action of frequently occurred earthquakes, repairable under the action of design basis earthquakes, and not fall under the action of rarely occurred earthquakes", that is, the structure is allowed to undergo a large plastic deformation to dissipate energy under the action of the rarely occurred earthquake. The large residual deformation will form in the structure after the earthquake. The repair of earthquake-damaged structures is difficult and expensive and some buildings can't even be repaired but pushed over for reconstruction, which causes a great waste of resources. Therefore, researchers have been studying self-centering structures.

Now, for the self-centering structure, the self-centering ability is mainly implemented by applying pre-stress on the structure, and friction members are added to increase the energy dissipation. The above method is easier to implement when applied to a new structure, but when applied to an existing building, the construction is complex.

SUMMARY OF THE INVENTION

The present invention provides a damper that has good energy dissipation and self-centering ability, from the perspective of facilitating application.

The present invention provides a self-centering viscous damper with pre-pressed ring springs, including an outer cylinder, a first connector, a first inner cylinder, a first end cover, a third inner cylinder, a second end cover, a second inner cylinder and a second connector disposed in the outer cylinder and connected sequentially in an axial direction thereof, a first outer cover disposed at one end of the outer cylinder and a second outer cover disposed at the other end, a piston rod disposed in the first inner cylinder, the second inner cylinder and the third inner cylinder and passing through the second end cover, the first end cover and the first outer cover, a piston disposed on the piston rod and located between the first end cover and the second end cover, a first linking nut disposed on the piston rod and located in the first connector, a second linking nut disposed at one end of the piston rod and located in the second connector, a first end disposed at the other end of the piston rod, and ring springs disposed in the outer cylinder and sleeved outside the first connector, the first inner cylinder, the first end cover, the third inner cylinder, the second end cover, the second inner cylinder and the second connector, wherein one end of the first inner cylinder is connected to the third inner cylinder and the other end is connected to the first outer cover, one end of the second inner cylinder is connected to the third inner cylinder and the other end is connected to the second outer cover, the second outer cover is provided with a second end, the first inner cylinder and the second inner cylinder are provided with grooves, and the first connector and the second connector are also respectively provided with grooves corresponding to the first inner cylinder and the second inner cylinder, such that the first connector is capable of being embedded into the first inner cylinder and movable therein in an axial direction of the first inner cylinder, and the second connector is capable of being embedded into the second inner cylinder and movable therein in an axial direction of the second inner cylinder.

Further, in the self-centering viscous damper with pre-pressed ring springs of the present invention, an oil cylinder is formed between the first end cover and the second end cover, the oil cylinder is filled with silicone oil, the piston is placed in the oil cylinder and connected to the piston rod, and the piston rod traverses the oil cylinder.

Further, in the self-centering viscous damper with pre-pressed ring springs of the present invention, the first inner cylinder, the second inner cylinder and the third inner cylinder are components that are connected together.

Further, in the self-centering viscous damper with pre-pressed ring springs of the present invention, the ring springs are applied with pre-pressure.

Further, in the self-centering viscous damper with pre-pressed ring springs of the present invention, the pre-pressure of the ring springs is equal to a sum of a frictional force of the damper and a restoring force needing to be applied to an external structure.

In the self-centering viscous damper with pre-pressed ring springs of the present invention, the respective components should satisfy the requirement that buckling deformation does not occur during use.

Further, the ring spring is further pressed whether the damper of the present invention is tensioned or pressed. The damper is equivalent to including both an energy dissipating system and a self-centering system. The energy dissipating system consists of two parts: viscous energy dissipation and frictional energy dissipation of the ring springs. The self-centering system consists of the ring springs.

In the present invention, due to the interaction between inner and outer cylinders, the ring springs are further pressed whether the damper is tensioned or pressed. The ring springs have been applied with pre-pressure which can overcome the frictional force and the restoring force when the ring springs are in an initial equilibrium position. When the ring springs are further pressed, a rebound force of the ring springs pushes the damper back to the initial equilibrium position, and a structure is further pushed to self-centering. During an earthquake, the repeated movement of the piston in the oil cylinder can dissipate seismic energy. Moreover, due to the existence of own friction between the ring springs, the ring springs can further frictionally dissipate energy during the movement of the damper, where this part of the energy dissipation is independent of the speed. The damper manufactured in the present invention may be used for energy dissipation and self-centering for structures such as buildings and bridges.

Compared with the prior art, the present invention has the following advantages:

1. The energy dissipation is good. When a structure in which the damper is installed encounters an earthquake, the damper is repeatedly tensioned and pressed, the piston reciprocates in the oil cylinder, and the silicone oil quickly passes through a small hole in the piston, thereby converting vibration energy into heat energy for dissipation. Moreover, due to the existence of own friction between the ring springs, the ring springs may further frictionally dissipate energy during the movement of the damper. The frictional energy dissipation of the ring springs is independent of the speed. Therefore, the damper may improve a situation where the energy dissipation of an ordinary viscous damper at a low speed is insufficient.

2. The ring springs are further compressed whether the damper is tensioned or pressed. When the damper is tensioned or pressed, the linking nut will drive the connector to compress the ring springs.

3. The structure is enabled to self-centering. Existing self-centering viscous dampers have a certain self-centering capability, but do not achieve complete self-centering. Because, when the damper is in an equilibrium position, regardless of whether the spring is pre-loaded, the forces of the pair of springs are mutually equilibrated, and a resultant force is zero. Due to the existence of own frictional force of the damper as well as the force required for the structure reset, when the damper is not in the equilibrium position, it cannot completely return to the initial equilibrium position, that is, the complete self-centering cannot be implemented. When the structure is equipped with the damper provided by the present invention, the pre-loaded ring springs are further compressed when the structure is to undergo deformation under the action of the earthquake, regardless of whether the damper is pressed or tensioned. The spring has been applied with pre-pressure which overcomes a frictional force and a restoring force when the spring is in an initial equilibrium position. When the spring is further pressed, a rebound force of the spring pushes the damper back to the initial equilibrium position, and structure self-centering is further implemented.

DETAILED DESCRIPTION OF THE INVENTION

Figure 1:
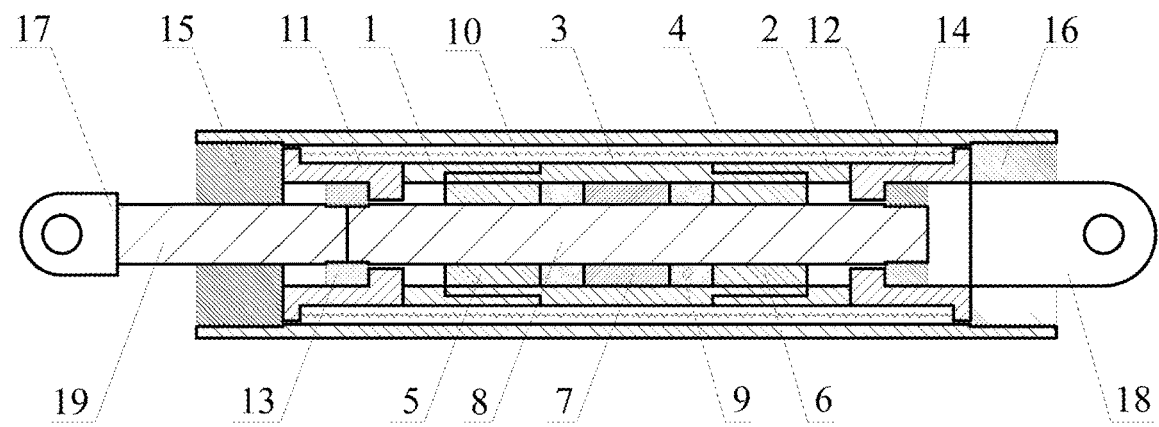
FIG. 1 is a schematic diagram of a damper.
Figure 2A:
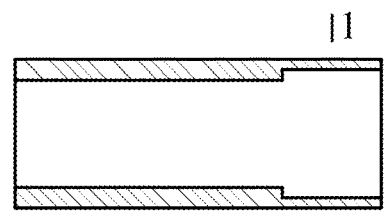
FIG. 2(a) is a schematic diagram of a first inner cylinder in a longitudinal sectional view of the first inner cylinder.
Figure 2B:
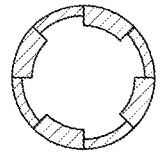
FIG. 2(b) is a cross-sectional view of 1-1.
Figure 3A:
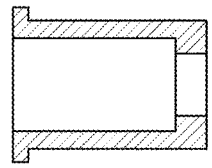
FIG. 3(a) is a schematic diagram of a first connector in a longitudinal sectional view of the first connector.
Figure 3B:
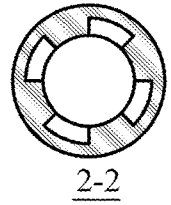
FIG. 3(b) is a cross-sectional view of 2-2.
Figure 3C:
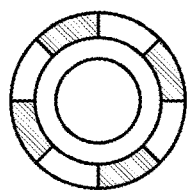
FIG. 3(c) is a cross-sectional view of 3-3.
Figure 3D:
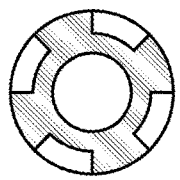
FIG. 3(d) is a cross-sectional view of 4-4.
Figure 4:
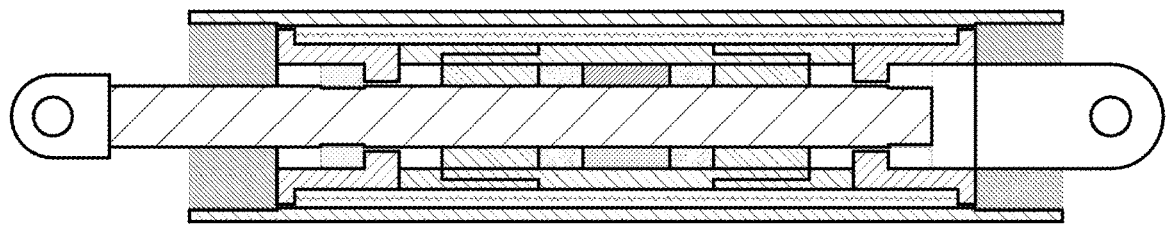
FIG. 4 is a schematic diagram showing an equilibrium state of the damper.
Figure 5:
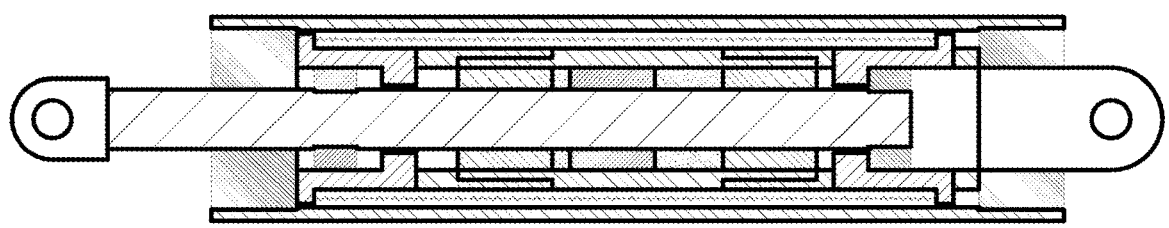
FIG. 5 is a schematic diagram showing a tensioned state of the damper.
Figure 6:
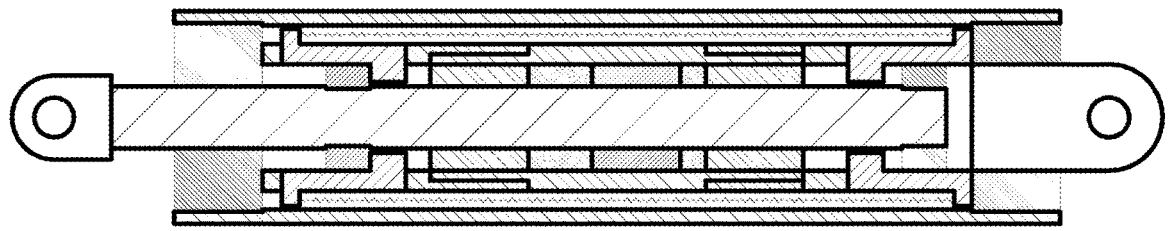
FIG. 6 is a schematic diagram showing a pressed state of the damper.

The present invention will now be further described in conjunction with the embodiments and the drawings.

The specific implementation process of the self-centering viscous damper with pre-pressed ring springs provided by the present invention is as follows:

(1) A first end cover 5 is installed at one end of a third inner cylinder 3, a piston 7 and a piston rod 8 are assembled together and placed together in the third inner cylinder 3, one end of the piston rod 8 passes through the first end cover 5, the piston 7 is located in an oil cylinder, then silicone oil 9 is injected into the oil cylinder, after filling, a second end cover 6 is installed at the other end of the third inner cylinder 3, and the other end of the piston rod 8 passes through the second end cover 6.

(2) A first inner cylinder 1 and a second inner cylinder 2 are respectively installed at both ends of the third inner cylinder 3, a first connector 11 is capable of being embedded into the first inner cylinder 1, and then a first linking nut 13 is installed at an end of the piston rod 8.

(3) ring springs 10 is sleeved outside the inner cylinder, a second connector 12 is capable of being embedded into the second inner cylinder 2, and after the spring is pre-pressed to a specified pre-pressure, a second linking nut 14 is installed at the other end of the piston rod 8.

(4) A first outer cover 15 is connected to the first inner cylinder 1, an outer cylinder 4 is installed on the first outer cover 15, and then a second outer cover 16 is connected to the second inner cylinder 2 and the outer cylinder 4.

(5) An outer piston rod 19, a first end 17 and a second end 18 are installed.

When a structure in which the damper provided by the present invention is installed encounters an earthquake, the damper is repeatedly tensioned and pressed, the piston 7 reciprocates in the oil cylinder, and the silicone oil 9 quickly passes through a small hole in the piston 7, thereby converting vibration energy into heat energy for dissipation. When the structure is to undergo deformation and the damper is pressed, the piston rod 8 will drive the first linking nut 13 and the first connector 11 to move rightwards, thereby compressing the ring springs 10. When the damper is tensioned, the piston rod 8 will drive the second linking nut 14 and the second connector 12 to move leftwards, thereby compressing the ring springs 10. That is, the pre-loaded ring springs 10 are further compressed regardless of whether the damper is pressed or tensioned. The ring springs 10 have been applied with pre-pressure which overcomes a frictional force and a restoring force when the ring springs are in an initial equilibrium position. When the ring springs 10 are further pressed, a rebound force of the ring springs 10 pushes the damper back to the initial equilibrium position, and structural self-centering is further implemented.

What is claimed is:

1. A self-centering viscous damper with pre-pressed ring springs, comprising an outer cylinder, a first connector, a first inner cylinder, a first end cover, a third inner cylinder, a second end cover, a second inner cylinder and a second connector disposed in the outer cylinder and connected sequentially in an axial direction thereof, a first outer cover disposed at one end of the outer cylinder and a second outer cover disposed at the other end of the outer cylinder, a piston rod disposed in the first inner cylinder, the second inner cylinder and the third inner cylinder and passing through the second end cover, the first end cover and the first outer cover, a piston disposed on the piston rod and located between the first end cover and the second end cover, a first linking nut disposed on the piston rod and located in the first connector, a second linking nut disposed at one end of the piston rod and located in the second connector, a first end disposed at the other end of the piston rod, and ring springs disposed in the outer cylinder and sleeved over the first connector, the first inner cylinder, the first end cover, the third inner cylinder the second end cover, the second inner cylinder and the second connector, wherein one end of the first inner cylinder is connected to the third inner cylinder and the other end is connected to the first outer cover, one end of the second inner cylinder is connected to the third inner cylinder and the other end of the second inner cylinder is connected to the second outer cover, the second outer cover is provided with a second end, the first inner cylinder and the second inner cylinder are provided with grooves, and the first connector and the second connector are also respectively provided with grooves corresponding to the first inner cylinder and the second inner cylinder, such that the first connector is capable of being embedded into the first inner cylinder and movable therein in an axial direction of the first inner cylinder, and the second connector is capable of being embedded into the second inner cylinder and movable therein in an axial direction of the second inner cylinder.

2. The self-centering viscous damper with pre-pressed ring springs according to claim 1, wherein an oil cylinder is formed between the first end cover and the second end cover, the oil cylinder is filled with silicone oil, the piston is placed in the oil cylinder and connected to the piston rod, and the piston rod traverses the oil cylinder.

3. The self-centering viscous damper with pre-pressed ring springs according to claim 2, wherein the ring springs are applied with pre-pressure.

4. The self-centering viscous damper with pre-pressed ring springs according to claim 3, wherein the pre-pressure of the ring springs is equal to a sum of a frictional force of the damper and a restoring force needing to be applied to an external structure.

5. The self-centering viscous damper with pre-pressed ring springs according to claim 1, wherein the first inner cylinder, the second inner cylinder and the third inner cylinder are components that are connected together.

6. The self-centering viscous damper with pre-pressed ring springs according to claim 5, wherein the ring springs are applied with pre-pressure.

7. The self-centering viscous damper with pre-pressed ring springs according to claim 6, wherein the pre-pressure of the ring springs is equal to a sum of a frictional force of the damper and a restoring force needing to be applied to an external structure.

8. The self-centering viscous damper with pre-pressed ring springs according to claim 1, wherein the ring springs are applied with pre-pressure.

9. The self-centering viscous damper with pre-pressed ring springs according to claim 8, wherein the pre-pressure of the ring springs is equal to a sum of a frictional force of the damper and a restoring force needing to be applied to an external structure.

* * * * *